(12) United States Patent
Chen et al.

(10) Patent No.: US 11,681,271 B2
(45) Date of Patent: Jun. 20, 2023

(54) DISTRIBUTED MULTI-NODE CONTROL SYSTEM AND METHOD, AND CONTROL NODE

(71) Applicant: QKM TECHNOLOGY (DONG GUAN) CO., LTD, Guangdong (CN)

(72) Inventors: Lihui Chen, Guangdong (CN); Chi Sha, Guangdong (CN); Bin Wang, Guangdong (CN); Yu Lei, Guangdong (CN); Rongkui Zheng, Guangdong (CN); Jiang Liu, Guangdong (CN); Zhongcai Guo, Guangdong (CN); Hui Du, Guangdong (CN); Xuelin Tian, Guangdong (CN)

(73) Assignee: QKM TECHNOLOGY (DONG GUAN) CO., LTD, Guangdong (CN)

(*) Notice: Subject to any disclaimer, the term of this patent is extended or adjusted under 35 U.S.C. 154(b) by 80 days.

(21) Appl. No.: 17/054,410

(22) PCT Filed: Jun. 20, 2019

(86) PCT No.: PCT/CN2019/092124
§ 371 (c)(1),
(2) Date: Nov. 10, 2020

(87) PCT Pub. No.: WO2019/242696
PCT Pub. Date: Dec. 26, 2019

(65) Prior Publication Data
US 2021/0240163 A1    Aug. 5, 2021

(30) Foreign Application Priority Data
Jun. 20, 2018 (CN) .......................... 201810637356.4

(51) Int. Cl.
G05B 19/414    (2006.01)
G05B 19/408    (2006.01)
G05B 23/02     (2006.01)

(52) U.S. Cl.
CPC ....... G05B 19/4148 (2013.01); G05B 19/408 (2013.01); G05B 23/027 (2013.01); G05B 23/0262 (2013.01)

(58) Field of Classification Search
None
See application file for complete search history.

(56) References Cited

U.S. PATENT DOCUMENTS

2013/0018507 A1* 1/2013 Haag ...................... B25J 9/161
                                                      700/245
2017/0075345 A1   3/2017 Fisher et al.
(Continued)

FOREIGN PATENT DOCUMENTS

CN    105824303      8/2016
CN    106444685 A    2/2017
(Continued)

OTHER PUBLICATIONS

Whitcomb et al., "Preliminary Experiments in Real Time Distributed Robot Control", Oct. 1988, Proceedings of the 1988 North American Transputer Users Group Meeting, pp. 1, 11-13 (Year: 1988).*
(Continued)

*Primary Examiner* — Mohammad Ali
*Assistant Examiner* — David Earl Ogg
(74) *Attorney, Agent, or Firm* — Hodgson Russ LLP

(57) ABSTRACT

A distributed multi-node control system (100) and method, relating to the field of control technology. The distributed multi-node control system (100) comprises: a first control node (11), a second control node (12), a plurality of servo
(Continued)

nodes (20) and a plurality of execution devices (30), the first control node (11) and the second control node (12) being respectively communicationally connected to the plurality of servo nodes (20), the servo nodes (20) being electrically connected to the execution devices (30) and configured to control operating states of the corresponding execution devices (30), the first control node (11) being configured to control an operating state of at least one first servo node (21) among the plurality of servo nodes (20), the second control node (12) being configured to control an operating state of at least one second servo node (22) among the plurality of servo nodes (20).

14 Claims, 2 Drawing Sheets

(56) References Cited

U.S. PATENT DOCUMENTS

| | | | | |
|---|---|---|---|---|
| 2018/0121240 A1* | 5/2018 | Cai | ................. | G06F 9/4881 |
| 2018/0329746 A1* | 11/2018 | Park | ................. | G06T 1/20 |
| 2020/0244594 A1* | 7/2020 | Yoneda | ................. | H04L 67/12 |

FOREIGN PATENT DOCUMENTS

| | | | | |
|---|---|---|---|---|
| CN | 107577185 A | | 1/2018 | |
| CN | 106301522 B | * | 5/2020 | ............. H04B 7/155 |
| EP | 3088971 A1 | | 11/2016 | |
| WO | WO-2017097006 A1 | * | 6/2017 | .......... G06F 11/1448 |

OTHER PUBLICATIONS

Murayama, "Distributed Control System", 1991, IEEE 7803-0078/91/06000, pp. 1501-1504 (Year: 1991).*

Guimbretiere et al., "An Asymmetric Dual-Processor Architecture for Low Power Information Appliances" May 2011, ACM Transactions on Embedded Computing Systems vol. XX No. XX Article XX, pp. 6-7 (Year: 2011).*

Rai et al., "Multi-Thread Based Synchronization of Locomotion Control in Snake Robots", Mar. 2014, ICCAS2005, pp. 2-4 (Year: 2014).*

WIPO, ISR for PCT/CN2019/092124, dated Oct. 16, 2019.

SIPO, First Office Action for CN 201810637356.4, dated Jun. 28, 2019.

EPO, Communication Pursuant to Rule 164(1) EPC issued to EP Application No. 19821703.6, Jan. 31, 2022.

* cited by examiner

DISTRIBUTED MULTI-NODE CONTROL SYSTEM AND METHOD, AND CONTROL NODE

CROSS-REFERENCE TO RELATED APPLICATION(S)

The application is a U.S. national phase of International Application No. PCT/CN2019/092124, filed on Jun. 20, 2019, which claims priority to Chinese Patent Application No. CN201810637356.4 filed on Jun. 20, 2018, the disclosure of which is hereby incorporated herein by reference.

FIELD

The disclosure relates to the field of control technologies, more particularly to a distributed multi-node control system and a distributed multi-node control method.

BACKGROUND

Industrial robots will play an increasingly important role in future production because of their stability and high efficiency as the development of science and technology. More and more industries may employ the industrial robots instead of people to complete repetitive tasks. Controllers, as the most important part of the industrial robots, may have some practical problems in current applications. On the one hand, a whole machine needs to be repaired once a fault occurs in the controller due to the high integration of the controller, causing a high cost. On the other hand, the controller has a heavy workload and may not guarantee the control efficiency.

SUMMARY

Embodiments of the disclosure provide a distributed multi-node control system. The distributed multi-node control system includes: a first control node, a second control node, a plurality of servo nodes, and a plurality of execution devices, the first control node and the second control node being communicatively coupled to the plurality of servo nodes, and each servo node being electronically coupled to one corresponding execution device and configured to control an operating state of the corresponding execution device; and the first control node is configured to control an operating state of at least one first servo node in the plurality of servo nodes, and the second control node is configured to control an operating state of at least one second servo node in the plurality of servo nodes.

Embodiments of the disclosure provide a distributed multi-node control method, implemented in a control node in a distributed multi-node control system. The system includes the control node, a plurality of servo nodes, and a plurality of execution devices. The first control node includes a first kernel and a second kernel. The method includes: receiving, by the first kernel, a control instruction; sending, by the first kernel, the received control instruction to the second kernel; calculating, by the second kernel, an execution instruction corresponding to each servo node based on the control instruction and the servo nodes; sending, by the second kernel, each execution instruction to the corresponding servo node; and controlling, by the servo node, an operating state of the corresponding execution device based on the received execution instruction.

Embodiments of the disclosure provide a control node, including: a first kernel configured to receive a control instruction and to send the received control instruction to a second kernel; and the second kernel configured to calculate an execution instruction corresponding to each servo node corresponding to the control node based on the control instruction and each servo node corresponding to the control node, and to distribute each execution instruction to the corresponding first servo node.

In order to enable the above objectives, features and advantages of the disclosure more obvious and understandable, following detailed description is made below with reference to preferred embodiments and accompanying drawings.

BRIEF DESCRIPTION OF THE DRAWINGS

In order to clearly illustrate technical solutions in embodiments of the disclosure, a brief description is made below to accompanying drawings used in the embodiments. It should be understood that, the following accompanying drawings merely illustrate some embodiments of the disclosure, and do not be considered as a limitation to the scope. For those skilled in the art, other related accompanying drawings may also be obtained based on these accompanying drawings without creative labor.

Figure 1:
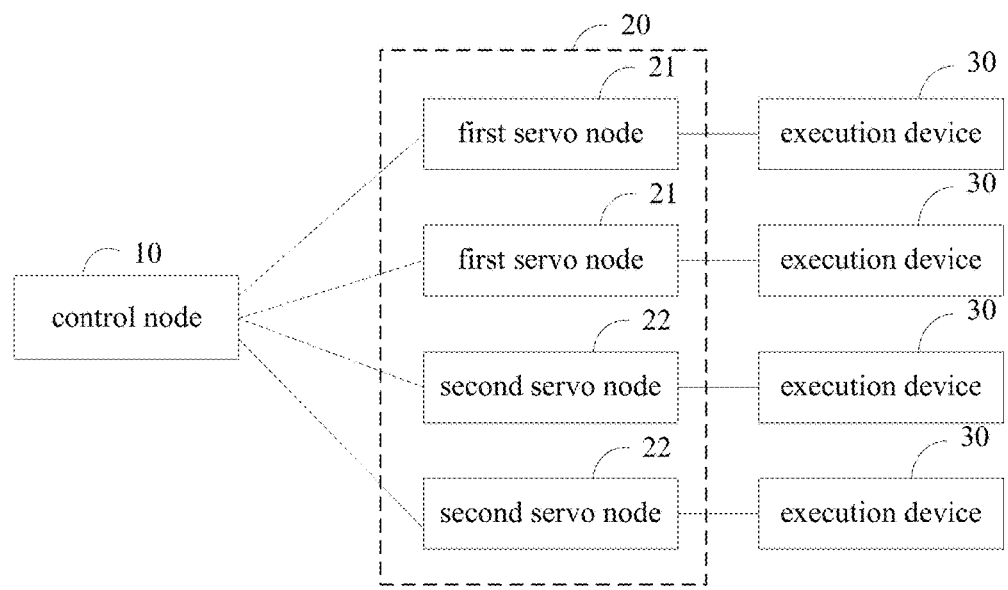
FIG. 1 is a schematic diagram illustrating a distributed multi-node control system according to a preferred embodiment of the disclosure.

Reference Numerals: 100, distributed multi-node control system; 10, control node; 11, first control node; 111, first kernel; 112, second kernel; 113, sharing storage area; 12, second control node; 20, servo node; 21, first servo node; 22, second servo node; 30, execution device; 40, scheduling control node.

DETAILED DESCRIPTION

Description will be made clearly and completely below to the technical solutions in embodiments of the disclosure with reference to accompanying drawings in embodiments of the disclosure. Obviously, the described embodiments are merely a part of the embodiments of the disclosure, not all of the embodiments. Components in embodiments of the disclosure illustrated and described in the accompanying drawings herein may be arranged and designed with different configurations. Therefore, detailed description for embodiments of the disclosure provided in the following accompanying drawings does not limit the claimed protection scope of the disclosure, but merely represents selected embodiments of the disclosure. Based on embodiments of the disclosure, all other embodiments obtained by those skilled in the art without creative labor belong to the protection scope of the disclosure.

It should be noted that similar items are represented by same numerals and letters in the accompanying drawings. Therefore, once an item is defined in an accompanying drawing, the item does not need to be further defined and explained in the following accompanying drawings. Meanwhile, in the description of the disclosure, terms such as "first" and "second" are used for purposes of distinguishing description and are not understood to indicate or imply relative importance.

Embodiment One

Referring to FIG. 1, FIG. 1 is a schematic diagram illustrating a distributed multi-node control system 100 according to a preferred embodiment of the disclosure. As illustrated in FIG. 1, the distributed multi-node control system 100 includes a control node 10, a plurality of servo nodes 20, and a plurality of execution devices 30. The control node 10 is communicatively coupled to the servo node 20. The servo node 20 is electronically coupled to the execution device 30.

Figure 2:
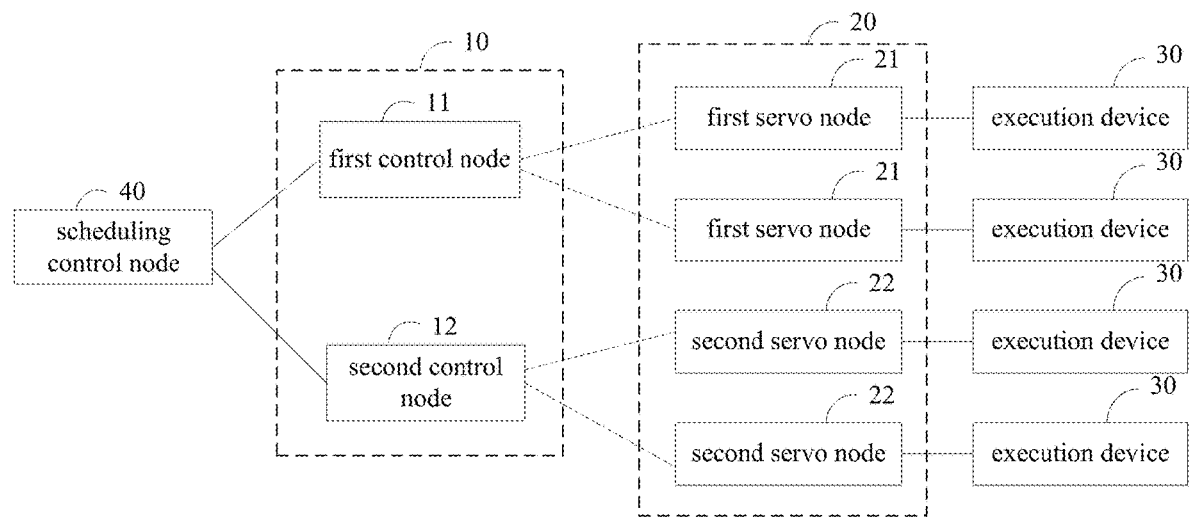
FIG. 2 a schematic diagram illustrating a distributed multi-node control system according to another preferred embodiment of the disclosure.

In embodiments of the disclosure, as illustrated in FIG. 2, the above distributed multi-node control system 100 also includes a scheduling control node 40. The control node 10 may include, but be not limited to, a first control node 11 and a second control node 12. The scheduling control node 40 is communicatively coupled to the first control node 11 and the second control node 12. The first control node 11 and the second control node 12 are communicatively coupled to the plurality of servo nodes 20 respectively. The first control node 11 is configured to control an operating state of at least one first servo node 21 in the plurality of servo nodes 20. The second control node 12 is configured to control an operating state of at least one second servo node 22 in the plurality of servo nodes 20. The scheduling control node 40 may be configured to assign servo nodes 20 controlled by each control node 10.

Further, in order to make full use of resources of each control node 10, in embodiments of the disclosure, the scheduling control node 40 is also configured to obtain operating state information of the first control node 11 and the second control node 12 based on a preset time interval, and to adjust the number of the at least one first servo node 21 corresponding to the first control node 11 and the number of the at least one second servo node 22 corresponding to the second control node 12 based on the operating state information. The above operating state information may include system occupancy information, load information, and the like.

Comparing with a strategy that all servo devices are centrally controlled by one controller in the related art, with embodiments of the disclosure, the plurality of servo nodes 20 are assigned to the plurality of control nodes 10, thereby reducing a workload of each control node 10 and improving a computation speed.

In embodiments of the disclosure, both the first control node 11 and the second control node 12 are asymmetry dual-kernel architectures.

Alternatively, the first control node 11 includes a first kernel 111 for operating a Linux system and a second kernel 112 for operating a RTOS (real time operating system) system. The first kernel 111 is configured to receive a control instruction and to send the received control instruction to the second kernel 112. The second kernel 112 is configured to calculate an execution instruction corresponding to each first servo node 21 based on the control instruction and the at least one first servo node 21, and to distribute each execution instruction to the corresponding first servo node 21. The first kernel 111 for operating the Linux system is configured to communicate and interact with outside world, and to receive instructions, parameters, and the like. The second kernel 112 for operating the RTOS system is configured to process data received from the first kernel 111 to generate the execution instruction corresponding to each first servo node 21. The above execution instruction may refer to a servo instruction. The second kernel 112 is also configured to send the generated execution instruction to the corresponding first servo node 21 via a network.

Figure 3:
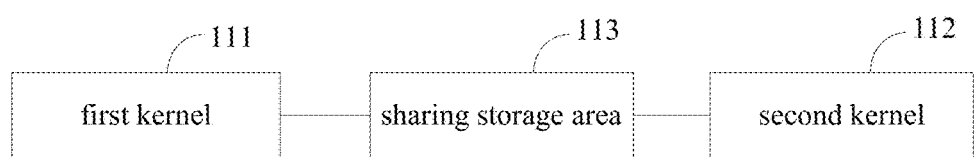
FIG. 3 is a schematic diagram illustrating a first control node according to a preferred embodiment of the disclosure.

Further, in the above procedure, there is a need to transmit data between the Linux system and the RTOS system, but data interaction between different systems is still incompatible. To solve the problem, in embodiments of the disclosure, as illustrated in FIG. 3, the first control node 11 includes a sharing storage area 113. The first kernel 111 is configured to convert data that is to be sent to the second kernel 112 into transmission data based on a preset protocol, and to store the transmission data in the sharing storage area 113. The first kernel 111 is configured to remind the second kernel 112 to read the transmission data from a corresponding position in the sharing storage area 113. In other words, data sent by the Linux system may be converted into data recognizable by the RTOS system based on the preset protocol. Of course, data sent by the RTOS system may be converted into data recognizable by the Linux system based on the preset protocol.

In embodiments of the disclosure, the first control node 11 is configured to obtain operating state data of the first servo node 21 and the corresponding execution device 30 based on a preset time interval. The first control node 11 is configured to start an abnormal warning operation when the operating state data obtained by the first control node 21 belongs to abnormal state data. Alternatively, a way for determining whether the operating state data belongs to the abnormal state data may include: comparing the operating state data returned by the servo node 20 or the operating state data returned by the corresponding execution device 30 with expected operating state data, thereby determining whether the operating state data belongs to the abnormal state data; or determining whether the operating state data returned by the servo node 20 or the operating state data returned by the corresponding execution device 30 includes abnormal information. Alternatively, the above abnormal warning operation may be performed by displaying an identifier of an execution device corresponding to the abnormal state data on a display unit of the first control node 11. For example, when the operating state data returned by the servo node 20 to the first control node 11 belongs to the abnormal state data, identification information of the servo node 20 is displayed on the display unit, which is convenient for a maintenance personnel to repair the execution device.

Alternatively, the second control node 12 includes a third kernel for operating the Linux system and a fourth kernel for operating the RTOS system. The third kernel is configured to receive a control instruction and to send the received control instruction to the fourth kernel. The fourth kernel is configured to calculate an execution instruction corresponding to each second servo node 22 based on the control instruction and the at least one second servo node 22, and to distribute each execution instruction to the corresponding second servo node 22. The third kernel for operating the Linux system is configured to communicate and interact with outside world, and to receive instructions, parameters, and the like. The fourth kernel for operating the RTOS system is configured to process data received from the third kernel to generate the execution instruction corresponding to each second servo node 22. The above execution instruction may refer to a servo instruction. The fourth kernel is also configured to send the generated execution instruction to the corresponding second servo node 22 via the network.

Further, the second control node 12 also includes a sharing storage area 113. The third kernel is configured to convert data that is to be sent to the fourth kernel into transmission data based on a preset protocol, and to store the transmission data in the sharing storage area 113. It should be noted that, data sent by the Linux system may be converted into data recognizable by the RTOS system based on the preset protocol. The third kernel is configured to send a triggering instruction to the fourth kernel after sending the transmission data to the sharing storage area 113, to remind the fourth kernel to read the transmission data from a corresponding position in the sharing storage area 113.

In embodiments of the disclosure, the second control node 12 is configured to obtain operating state data of the second servo node 22 and the corresponding execution device based on the preset time interval. The second control node 12 is configured to start an abnormal warning operation when the operating state data obtained by the second control node 12 belongs to the abnormal state data.

In embodiments of the disclosure, the servo nodes 20 is a dual-kernel architecture. Dual kernels corresponding to the servo node 20 are configured to operate the RTOS system. The servo node 20 is configured to perform task assignment based on a preset task allocation algorithm according to system resource occupation of the dual kernels after receiving the execution instruction.

In embodiments of the disclosure, the above execution device may be a control motor or an input/output (I/O) device.

Embodiment Two

Figure 4:
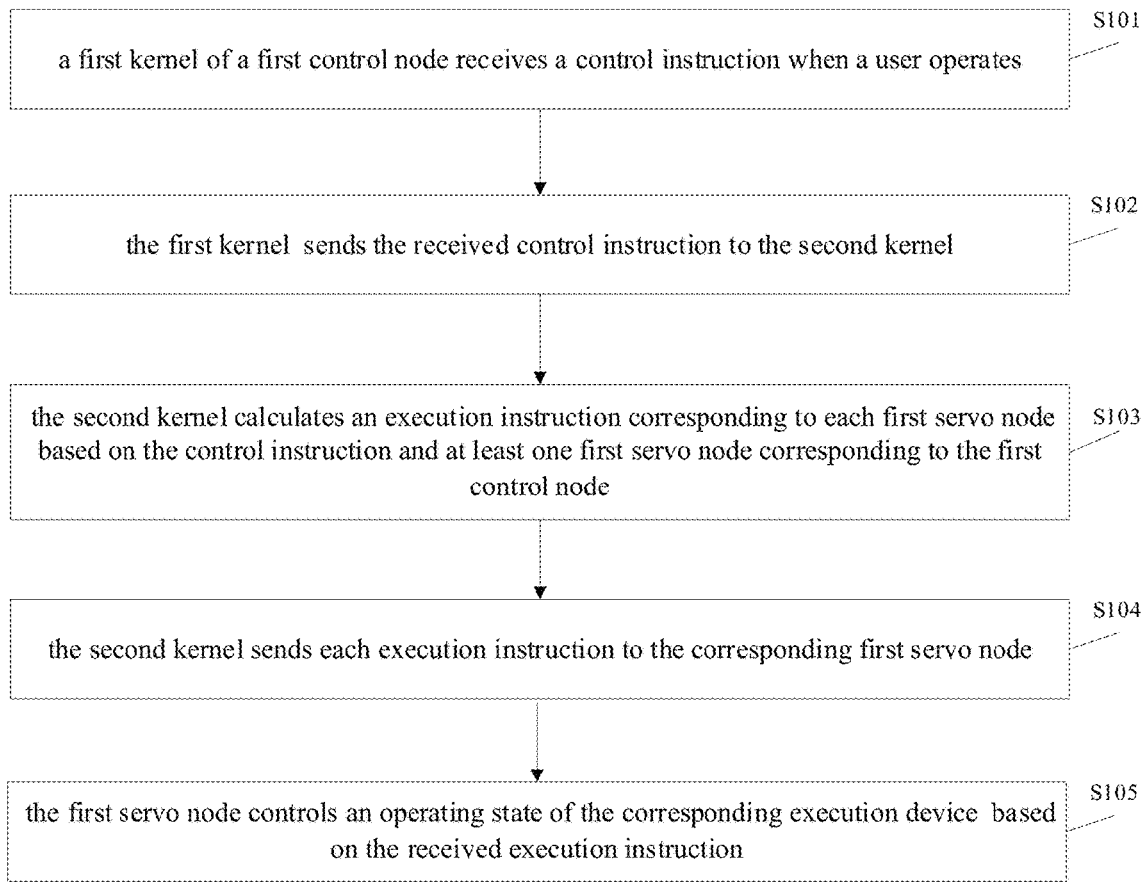
FIG. 4 is a flow chart illustrating a distributed multi-node control method according to a preferred embodiment of the disclosure.

Referring to FIG. 4, FIG. 4 is a flow chart illustrating a distributed multi-node control method according to a preferred embodiment of the disclosure. The distributed multi-node control method is applied to the above distributed multi-node control system 100.

As illustrated in FIG. 4, the distributed multi-node control method includes the following.

At block S101, a first kernel 111 of a first control node 11 receives a control instruction generated when a user operates.

At block S102, the first kernel 111 sends the received control instruction to the second kernel 112.

In some embodiments, the first kernel 111 may firstly convert the control instruction into transmission data recognizable by the second kernel 112 based on a preset protocol, and then stores the transmission data in a sharing storage area 113. Then the first kernel 111 triggers the second kernel 112 to obtain a control instruction of the recognizable transmission data converted from the sharing storage area 113.

At block S103, the second kernel 112 calculates an execution instruction corresponding to each first servo node 21 based on the control instruction and at least one first servo node 21 corresponding to the first control node.

At block S104, the second kernel 112 sends each execution instruction to the corresponding first servo node 21.

At block S105, the first servo node 21 controls an operating state of the corresponding execution device 30 based on the received execution instruction.

It should be noted that, a processing flow for all the control nodes 10 receiving the control instructions, parameters or the like generated by a user operation is basically the same as the above actions, which is not be elaborated here.

Figure 5:
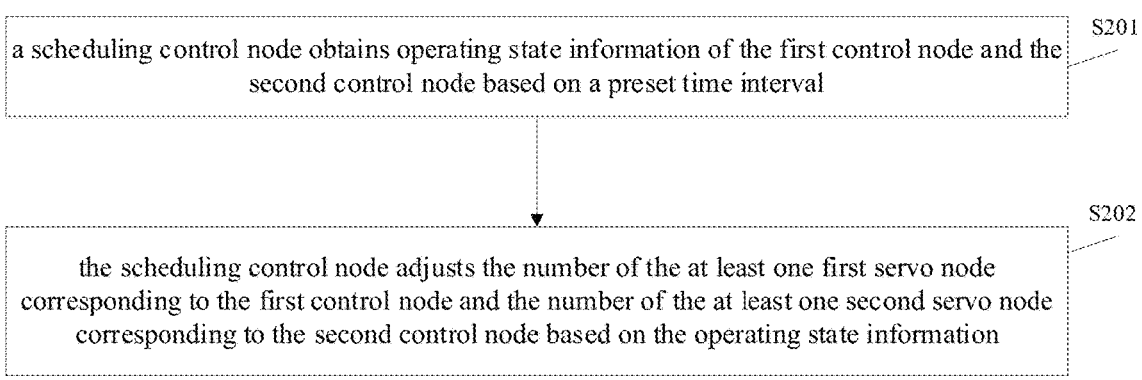
FIG. 5 is a block diagram illustrating another part of a distributed multi-node control method according to a preferred embodiment of the disclosure.

Further, as illustrated in FIG. 5, the above distributed multi-node control method may also include the following.

At block S201, a scheduling control node 40 obtains operating state information of the first control node 11 and the second control node 12 based on a preset time interval In embodiments of the disclosure, the above operating state information may refer to system resource occupation information, load information and the like of the control node 10.

At block S202, the scheduling control node 40 adjusts the number of the at least one first servo node corresponding to the first control node 11 and the number of the at least one second servo node corresponding to the second control node 12 based on the operating state information.

Further, the above distributed multi-node control method may also include the follows. The first control node 11 obtains operating state data of the first servo node 21 based on a preset time interval, and starts an abnormal warning operation related to the first servo node 21 when the obtained operating state data belongs to abnormal state data. The first control node 11 obtains operating state data of the execution device 30 through the first servo node 21 based on the preset time interval. When the obtained operating state data belongs to the abnormal state data, the first control node 11 starts an abnormal warning operation related to the execution device 30. The second control node 12 obtains the operating state data of the second servo node 22 based on a preset time interval. When the obtained operating state data belongs to the abnormal state data, the second control node 12 starts an abnormal warning operation related to the second servo node 22. The second control node 12 obtains the operating state data of the execution device 30 through the second servo node 22 based on the preset time interval. When the obtained operating state data belongs to the abnormal state data, the second control node 12 starts an abnormal warning operation related to the execution device 30. In this way, when a certain node fails in an operating period, the failed node may be replaced directly with a new node in the same type without replacing a whole machine. After reconfiguration, the whole machine may continue to run, which is convenient and saves costs. Then troubleshooting is performed on the replaced node, which has advantages that production is not affected and maintenance costs is not reduced In conclusion, with the distributed multi-node control system and method provided in the disclosure, the distributed multi-node control system includes the first control node, the second control node, the plurality of servo nodes, and the plurality of execution devices. The first control node is communicatively coupled to the plurality of servo nodes, and the second control node is communicatively coupled to the plurality of servo nodes. Each servo node is electrically coupled to one corresponding execution device and configured to control the operating state of the corresponding execution device. The first control node is configured to control the operating state of the at least one first servo node in the plurality of servo nodes, and the second control node is configured to control the operating state of the at least one second servo node in the plurality of servo nodes. A real-time computation is shared by a plurality of control nodes, thereby realizing a distributed control and speeding up the computation. Moreover, such system coordinating and cooperating with the plurality of control nodes is convenient for maintenance and saves maintenance cost.

In the plurality of embodiments provided by the disclosure, it should be understood that, the device and the method disclosed may also be implemented in other ways. The device embodiments described above are merely exemplary. For example, the flow charts and the block diagrams in the accompanying drawings illustrate architectures, functions and operations of possible implementations according to devices, methods and computer program products of a plurality of embodiments of the disclosure. Each block in the flow chart or block diagram may represent a module, program segment or part of codes, which contain one or more executable instructions configured to implement specified logical functions. It should be noted that, in some alternative implementations, the functions noted in the blocks may also occur in an order different from those noted in the accompanying drawings. For example, two consecutive blocks may actually be executed in parallel, and sometimes executed in a reverse order, depending on the involved functions. It also needs to be noted that, each block and combinations of blocks in the block diagrams and/or flow charts may be implemented with dedicated hardware-based systems for performing specified functions or actions, or may be implemented with a combination of dedicated hardware and computer instructions.

In addition, each functional module in each embodiment of the disclosure may be integrated together to form an independent part or exist alone, or two or more functional modules may also be integrated to form an independent part.

When the functions are realized in the form of software function modules, and sold or used as independent products, they may be stored in a computer readable storage medium. Based on this understanding, the technical solution of the disclosure, the part that contributes to the related art, or the part of the technical solution may be embodied in the form of software products in essence. The computer software product is stored in a storage medium and includes several instructions to enable a computer device (such as a personal computer, a server, or a network device) to execute all or part of the steps of the method described in each embodiment of the disclosure. The above storage media includes medias that may store program codes, such as, a U disk, a mobile hard disk, a read-only memory (ROM), a random access memory (RAM), a magnetic disk or an optical disk.

It should be noted that, in the description, relationship terms such as "first" and "second" are merely used to distinguish one entity or operation from another, and do not necessarily require or imply any such actual relationship or order between these entities or operations. The terms "comprising", "including" or any other variation thereof are intended to cover non-exclusive inclusion, such that a process, method, article or device including a series of elements includes not only those elements, but also other elements not explicitly listed, or elements inherent to such process, method, article or device. Without further limitation, it is not excluded that additional same elements exist in the process, method, article or device including elements defined by the sentence "including one . . . ".

The above is only preferred embodiments of the disclosure, and is not used to limit the disclosure. For the skilled in the art, the disclosure may be modified and varied. Any modification, equivalent substitution and improvement made within the spirit and principle of the disclosure shall be included in the protection scope of the disclosure. It should be noted that similar numerals and letters in the following accompanying drawings indicate similar items. Therefore, once a certain item is defined in an accompanying drawing, it does not need to be further defined and explained in the following accompanying drawings.

The above is merely detailed embodiments of the disclosure, but the protection scope of the disclosure is not limited to this. Any change or substitution which is easily thought of by the person familiar with this technical field within a technical scope disclosed in the disclosure should be covered within the protection scope of the disclosure. Therefore, the protection scope of the disclosure shall be subject to the protection scope of the claims.

What is claimed is:

1. A distributed multi-node control system, comprising: a first control node, a second control node, a plurality of servo nodes, and a plurality of execution devices, the first control node and the second control node being communicatively coupled to the plurality of servo nodes, and each servo node being electronically coupled to one corresponding execution device and configured to control an operating state of the corresponding execution device; and the first control node is configured to control an operating state of at least one first servo node in the plurality of servo nodes, and the second control node is configured to control an operating state of at least one second servo node in the plurality of servo nodes, wherein the distributed multi-node control system further comprises: a scheduling control node, and the scheduling control node is communicatively coupled to the first control node and the second control node; and the scheduling control node is configured to obtain operating state information of the first control node and the second control node based on a preset time interval, and to change a number of the at least one first servo node corresponding to the first control node, where the number is a total count of the first servo nodes that are controllable by the first control node under a current operating state of the first control node, and to change a number of the at least one second servo node corresponding to the second control node, where the number is a total count of the second servo nodes that are controllable by the second control node under a current operating state of the second control node;

wherein both the first control node and the second control node are asymmetry dual-kernel architectures;

wherein the first control node comprises a first kernel for operating a Linux system and a second kernel for operating a real time operating system, the first kernel is configured to receive a control instruction and to send the received control instruction to the second kernel, and the second kernel is configured to calculate an execution instruction corresponding to each first servo node based on the control instruction and the at least one first servo node, and to distribute each execution instruction to the corresponding first servo node.

2. The system of claim 1, wherein the first control node comprises a sharing storage area, the first kernel is configured to convert data that is to be sent to the second kernel, into transmission data based on a preset protocol, and to store the transmission data in the sharing storage area, and the first kernel is configured to remind the second kernel to read the transmission data from a corresponding position in the sharing storage area.

3. The system of claim 1, wherein each of the plurality of servo nodes are symmetric dual-kernel architectures, and dual kernels corresponding to each servo node are configured to operate a real time operating system.

4. The system of claim 1, wherein the first control node is configured to obtain operating state data of the first servo node and the corresponding execution device based on a preset time interval, and to start an abnormal warning operation when the operating state data obtained by the first control node belongs to abnormal state data; and the second control node is configured to obtain operating state data of the second servo node and the corresponding execution device based on a preset time interval, and to start an abnormal warning operation when the operating state data obtained by the second control node belongs to abnormal state data.

5. The system of claim 1, wherein the execution device comprises a control motor and an input/output (I/O) device.

6. A distributed multi-node control method, implemented in a control node in a distributed multi-node control system, wherein the system comprises the control node, a plurality of servo nodes, and a plurality of execution devices, the control node comprises a first kernel and a second kernel, and the method comprises:
receiving, by the first kernel, a control instruction;
sending, by the first kernel, the received control instruction to the second kernel;
calculating, by the second kernel, an execution instruction corresponding to each servo node based on the control instruction and the servo nodes;
sending, by the second kernel, each execution instruction to the corresponding servo node; and
controlling, by the servo node, an operating state of the corresponding execution device based on the received execution instruction,
wherein the control node comprises a first control node and a second control node, the servo nodes comprises at least one first servo node and at least one second servo node, the first control node is configured to control an operating state of the at least one first servo node, the second control node is configured to control an operating state of the at least one second servo node, the distributed multi-node control system further comprises: a scheduling control node, communicatively coupled to the first control node and the second control node; and the method further comprises:
obtaining, by the scheduling control node, operating state information of the first control node and the second control node based on a preset time interval; and
changing, by the scheduling control node, a number of the at least one first servo node corresponding to the first control node, where the number is a total count of the first servo nodes that are controllable by the first control node under a current operating state of the first control node and changing, by the scheduling control node, a number of the at least one second servo node corresponding to the second control node, where the number is a total count of the second servo nodes that are controllable by the second control node under a current operating state of the second control node.

7. The system of claim 1, wherein the second control node comprises a third kernel for operating a Linux system and a fourth kernel for operating a real time operating system, the third kernel is configured to receive a control instruction and to send the received control instruction to the fourth kernel, and the fourth kernel is configured to calculate an execution instruction corresponding to each second servo node based on the control instruction and the at least one second servo node, and to distribute each execution instruction to the corresponding second servo node.

8. The system of claim 7, wherein the second control node comprises a sharing storage area, the third kernel is configured to convert data that is to be sent to the fourth kernel, into transmission data based on a preset protocol, and to store the transmission data in the sharing storage area, and the third kernel is configured to remind the fourth kernel to read the transmission data from a corresponding position in the sharing storage area.

9. The system of claim 1, wherein,
the first control node is configured to obtain operating state data of the first servo node based on a preset time interval, and to start an abnormal warning operation when the operating state data obtained by the first control node belongs to abnormal state data; and
the second control node is configured to obtain operating state data of the second servo node based on a preset time interval, and to start an abnormal warning operation when the operating state data obtained by the second control node belongs to abnormal state data.

10. The system of claim 1, wherein,
the first control node is configured to obtain operating state data of the execution device through the corresponding first servo node based on a preset time interval, and to start an abnormal warning operation when the operating state data obtained by the first control node belongs to abnormal state data; and
the second control node is configured to obtain operating state data of the execution device through the corresponding second servo node based on a preset time interval, and to start an abnormal warning operation when the operating state data obtained by the second control node belongs to abnormal state data.

11. The method of claim 6, further comprising:
obtaining by the control node operating state data of the servo node and the corresponding execution device based on a preset time interval, and to start an abnormal warning operation when the operating state data obtained by the control node belongs to abnormal state data.

12. The method of claim 6, further comprising:
obtaining by the control node operating state data of the execution device through the corresponding servo node based on a preset time interval, and to start an abnormal warning operation when the operating state data obtained by the control node belongs to abnormal state data.

13. The method of claim 6, further comprising:
obtaining by the control node operating state data of the servo node based on a preset time interval, and to start an abnormal warning operation when the operating state data obtained by the control node belongs to abnormal state data.

14. The system of claim 4, wherein when the operating state data obtained by the first or second control node belongs to the abnormal state data, a node of the abnormal state data is replaced by a new node in the same type as the node of the abnormal state data.

* * * * *